United States Patent [19]
Lam

[11] Patent Number: 5,377,017
[45] Date of Patent: Dec. 27, 1994

[54] AUTOMATIC ON-LINE FACSIMILE CONFIRMATION

[76] Inventor: Felix L. Lam, 25100 La Loma Dr., Los Altos Hills, Calif. 94022

[21] Appl. No.: 860,869

[22] Filed: Mar. 31, 1992

[51] Int. Cl.⁵ .............................................. H04N 1/32
[52] U.S. Cl. .................................. 358/405; 358/434; 358/435
[58] Field of Search ............... 358/400, 401, 405, 406, 358/434, 435, 436, 438, 439, 440, 443, 447, 448, 468; 379/93, 100

[56] References Cited

U.S. PATENT DOCUMENTS

| | | | |
|---|---|---|---|
| 4,613,907 | 9/1986 | Yoshimoto et al. | 358/257 |
| 4,769,719 | 9/1988 | Endo | 358/296 |
| 4,841,373 | 6/1989 | Asami et al. | |
| 4,887,162 | 12/1989 | Arai | |
| 4,922,524 | 5/1990 | Baba et al. | |
| 4,924,324 | 5/1990 | Takaoka | |
| 4,999,716 | 3/1991 | Nakamura | 358/434 |

Primary Examiner—Bentsu Ro
Attorney, Agent, or Firm—Skjerven, Morrill, MacPherson, Franklin & Friel

[57] ABSTRACT

A method and apparatus are provided which allow for confirmation of facsimile message reception and transmission quality. In one embodiment, a series of signals between source and destination station, both having confirming modes, ensures the appropriate confirmation of facsimile transmission. In another embodiment, an add-on device is coupled to a non-confirming facsimile device to convert it to a confirming device.

23 Claims, 15 Drawing Sheets

| Source Station | Destination Station |
|---|---|
| Sets up PBP Confirmation | Sets up PBP Confirmation — 401 |
| Sends first facsimile image page | Receives first facsimile image page — 402 |
| Switches direction of transmission | Switches direction of transmission — 403 |
| Receives facsimile image page just sent | Sends facsimile image page just received — 404 |
| Switches direction of transmission | Switches direction of transmission — 405 |
| Sends next facsimile image page | Receives next facsimile image page — 406 |
| • • • • | • • • • |
| Sends last facsimile image page | Receives last facsimile image page |
| Switches direction of transmission | Switches direction of transmission |
| Receives facsimile image page just sent | Sends facsimile image page just received — 407 |
| End | End — 408 |

KEY TO

| FIG.3(1) |
| FIG.3(2) |

| Source Station | Destination Station | |
|---|---|---|
| Sets up PBP Confirmation | Sets up PBP Confirmation | 401 |
| Sends first facsimile image page | Receives first facsimile image page | 402 |
| Switches direction of transmission | Switches direction of transmission | 403 |
| Receives facsimile image page just sent | Sends facsimile image page just received | 404 |
| Switches direction of transmission | Switches direction of transmission | 405 |
| Sends next facsimile image page | Receives next facsimile image page | 406 |
| ⋮ | ⋮ | |
| Sends last facsimile image page | Receives last facsimile image page | |
| Switches direction of transmission | Switches direction of transmission | |
| Receives facsimile image page just sent | Sends facsimile image page just received | 407 |
| End | End | 408 |

FIG. 4

KEY TO

AUTOMATIC ON-LINE FACSIMILE CONFIRMATION

BACKGROUND OF THE INVENTION

This invention relates to facsimile machines and in particular to a structure for and methods of confirming receipt of a transmitted facsimile message.

DESCRIPTION OF THE PRIOR ART

An automatic facsimile transmission includes two types of signals: procedure signals exchanged between the source facsimile machine and destination facsimile machine, and message data signals (in units of a page) transmitted from the source to the destination. The procedure signal exchange controls the message data transmission in a step-by-step manner with provisions for error control and recovery.

Both the procedure signals and the encoding/decoding of message data signals are defined internationally in standards manuals, most notably in the CCITT T Series and V Series Recommendations as promulgated by the International Telegraph and Telephone Consultative Committee, published in 1988, which is incorporated herein by reference in its entirety. Due to the requirement of inter-operability for a facsimile machine with a facsimile machine of any make, the majority of facsimile machines conform to the CCITT standards.

Although the procedure signals are designed to ensure the integrity of the facsimile transmission process, senders are constantly unsure of the actual reception of the document at the destination station because of minimal, if any, feedback from the destination station to the sender. As more facsimile machines are completely automated, i.e. unattended, the facsimile sender is necessarily dependent on the proper operation of many pieces of equipment in the facsimile transmission and delivery, any of which may malfunction at any given time.

In order to ascertain the actual reception of important documents transmitted by facsimile, the sender must phone the destination. Even assuming that someone is available at the destination to confirm the receipt of the transmitted document, this practice remains expensive, inconvenient, and inefficient. This is especially true when there is a substantial time difference between the source and the destination of the facsimile transmission, which occurs when sending documents internationally.

Furthermore, even if all pages of the transmitted document are properly received at the destination, the images on the pages may have arrived at the destination in poor quality because of noise on the transmission path. A conventional facsimile machine does not offer feedback that accurately confirms transmission quality. The CCITT standards, mentioned previously, only partially alleviate the problem by using the error-correcting mode for the message data transmission.

U.S. Pat. No. 4,922,524 discloses a method by which a facsimile transmission includes both the image data and a customized voice message. Although this method provides an automated way of alerting the addressee to the imminent arrival of the transmitted document at the destination side, the method nevertheless requires the presence of an operator on the source side, which by definition is not possible for an unattended operation. Moreover, this method fails to solve the original problem of notifying the sender whether the document has successfully arrived at the destination.

Other facsimile machines offer only confirmation of the number of pages sent (not the number of pages received by the destination station or the quality of transmission of those pages) and/or error status (i.e. whether the communication path was interrupted).

Accordingly, a need arises for a method and/or apparatus which provides confirmation of the characters and images "actually" received in the facsimile transmission as well as the quality of the received characters.

SUMMARY OF THE INVENTION

In accordance with the present invention, a method and apparatus are provided which permit the source station of a facsimile message to automatically receive on-line confirmation of the actual message, or portions thereof, which were received by the destination facsimile machine. A portion of a facsimile message may be a whole page or a partial page comprised of predetermined lines.

In one embodiment, a single facsimile confirmation page includes selected portions from predetermined pages in combination with other information. For example, one illustrative confirmation page is divided into three sections. The top third of the confirmation page is a portion of the first page of the original facsimile message while the bottom third is a portion of the last page. The remaining third of the confirmation page includes summary information about the destination facsimile station (for example, its telephone number and location) and summary data about the facsimile transmission (for example, the number of pages and time and date of receipt).

The method and apparatus of this invention permits the transmitting party to determine any portion or portions of the received message which will be retransmitted by the receiving facsimile machine to the transmitting machine to allow the transmitting party to confirm receipt of the transmitted information at the receiving facsimile machine. This retransmission takes place at the end of the original facsimile transmission or after a predetermined number of pages. In another embodiment, the transmission and retransmission may interleave page by page.

In further accord with the present invention, a facsimile device is provided which transmits a received facsimile message or portions thereof to the source facsimile device, thereby confirming the actual message received by the receiving facsimile device. This confirmation is accomplished by a series of predetermined signals transmitted between source and destination stations. These predetermined signals include switching the direction of the facsimile transmission once the original transmission from the source to the destination station is completed, and sending a portion of or all the pages of that original facsimile transmission from the destination to the source station. In this manner, if the confirmation facsimile is of acceptable quality, the sender is assured the original facsimile transmission is the same, or better quality.

In another embodiment of the present invention, the on-line confirmation is achieved with the use of an add-on device to a non-confirming facsimile machine. The add-on device monitors a facsimile transmission between the non-confirming facsimile machine and a source or destination station until a disconnect signal is detected. At that time, the add-on device disconnects the non-confirming facsimile machine from the telephone network and, instead, connects itself to the telephone network. The add-on device then attempts to exchange signals with the facsimile device at the other station (i.e. source or destination station) for the purpose of sending or receiving facsimile confirmation. If the add-on device is attached to a source station, the received facsimile confirmation is transmitted from the add-on device to the source station as a regular facsimile message. The add-on device then disconnects itself from the telephone network and reconnects the telephone network once again to the non-confirming facsimile machine.

DESCRIPTION OF THE DRAWINGS

Other advantages of the present invention will become apparent from study of the specification and drawings in which:

FIG. 4 shows the logic flow between two facsimile machines performing a Page-by-Page Confirmation.

DETAILED DESCRIPTION OF THE INVENTION

The following description makes extensive use of the CCITT Recommendation T.30, "Procedures for Document Facsimile Transmission in the General Telephone Network". For convenience, a summary of the procedure signals used in the following description is listed in Appendix A.

Figure 1:
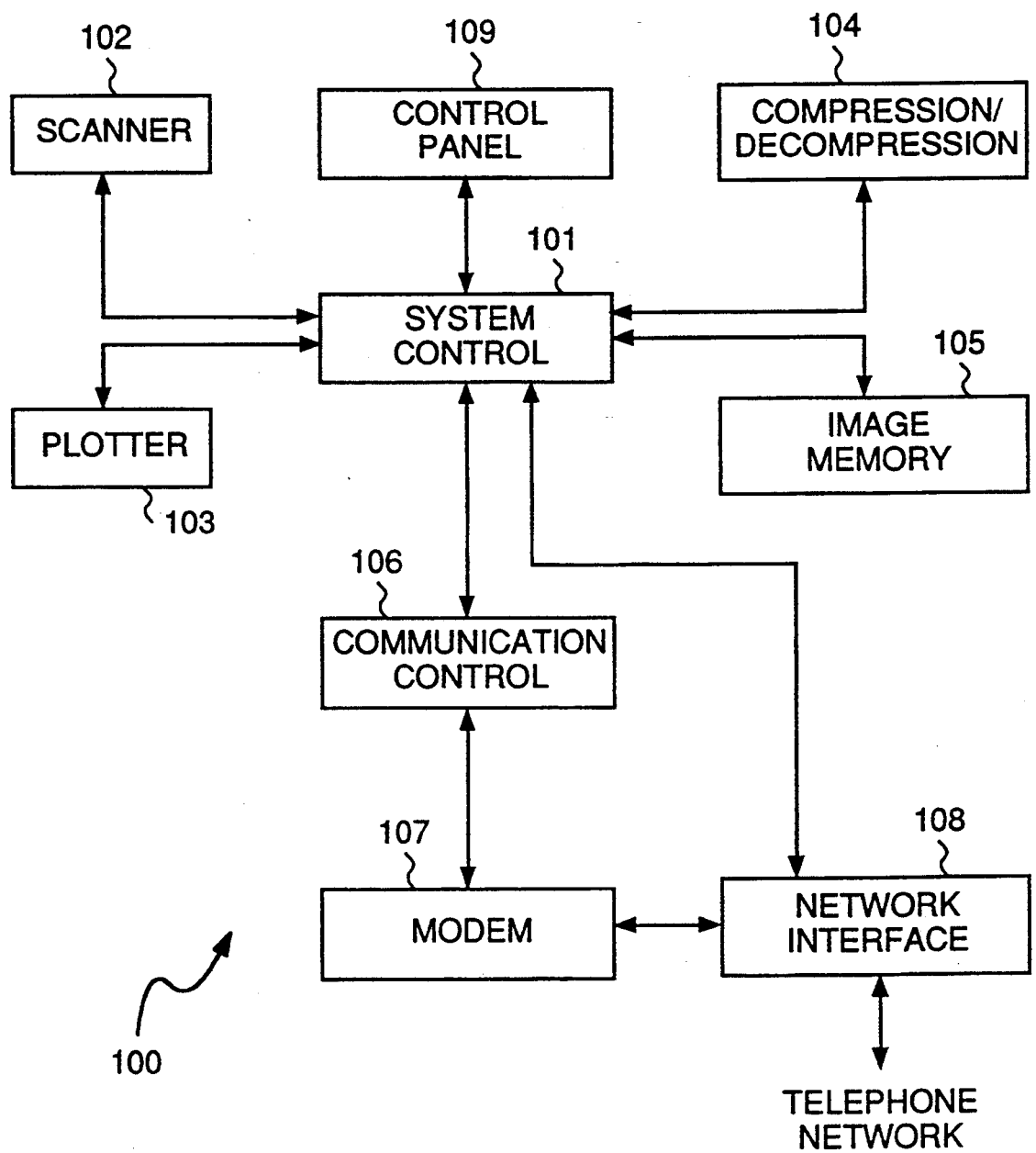
FIG. 1 is a block diagram illustrating the configuration of a typical facsimile machine.

FIG. 1 shows a block diagram of the configuration of a typical facsimile machine 100. As shown, facsimile machine 100 is controlled by a system control unit 101 which is in charge of the overall operation and all processes that take place in the facsimile machine. The system control unit 101 typically comprises a microprocessor.

Facsimile machine 100 further includes a scanner 102 for optically reading an original document page and converting it into image data at a predetermined resolution, and a plotter 103 for recording image data at a predetermined resolution onto a recording sheet. The image data is temporarily stored and retrieved from the image memory 105. Data compression/decompression unit 104 compresses the image data for transmission and decompresses image data that the facsimile machine receives.

Facsimile machine 100 also includes a communication control unit 106 which carries out a facsimile communication according to a selected procedure. Modem 107, connected to communication control unit 106, modulates the image and procedure signals for transmission to a telephone network, and demodulates the signals received from the telephone network. The network interface unit 108 connects the present facsimile machine to the telephone network. Control panel 109 allows an operator to provide various operational instructions to the facsimile machine. In accordance with the present invention, a facsimile confirmation is treated as an enhanced facsimile communication procedure carried out by communication control unit 106. The confirmation process is carried out by a series of control signals exchanged between the source and destination facsimile devices as described below in further detail.

In accordance with the present invention, different types of confirming modes for confirming receipt at the destination facsimile machine of the information transmitted from the source facsimile machine are carried out by communication control unit 106 with directions from the user via system control unit 101, while the image data needed by a destination facsimile machine for confirmation is stored in image memory 105.

In one mode, confirmation takes place at the end of a facsimile transmission (EOT Confirmation). End of transmission (EOT) confirmation includes transmission back to the source station of one or more facsimile image pages whose message data contents are taken from the facsimile document pages received by the destination.

In another mode, confirmation takes place at the end of transmission of each facsimile image page (Page-by-Page or PBP Confirmation). During page-by-page (PBP) confirmation, each transmitted facsimile image page is retransmitted to the source station. Thus, the entire transmitted document is sent back from the destination to the source. By confirming on a page-by-page basis, the image memory 105 is kept to a reasonable size.

In another mode, confirmation takes place after a predetermined number of pages. This confirmation includes transmission back to the source station of part or all of the entire contents of the facsimile image pages received at the destination since the last confirmation.

Various factors, including the importance of the transmitted message, the length of the message, and the cost of confirmation (which is borne by the sender), may determine which of the above confirmation modes the sender chooses.

Referring to FIG. 1, to initiate transmission of a document, the sender at the source station first places the document in scanner 102. The sender, by using control panel 109, then chooses the type of facsimile confirmation mode, inputs the phone number of the destination station, and depresses the start key to begin the transmission.

Figure 2:
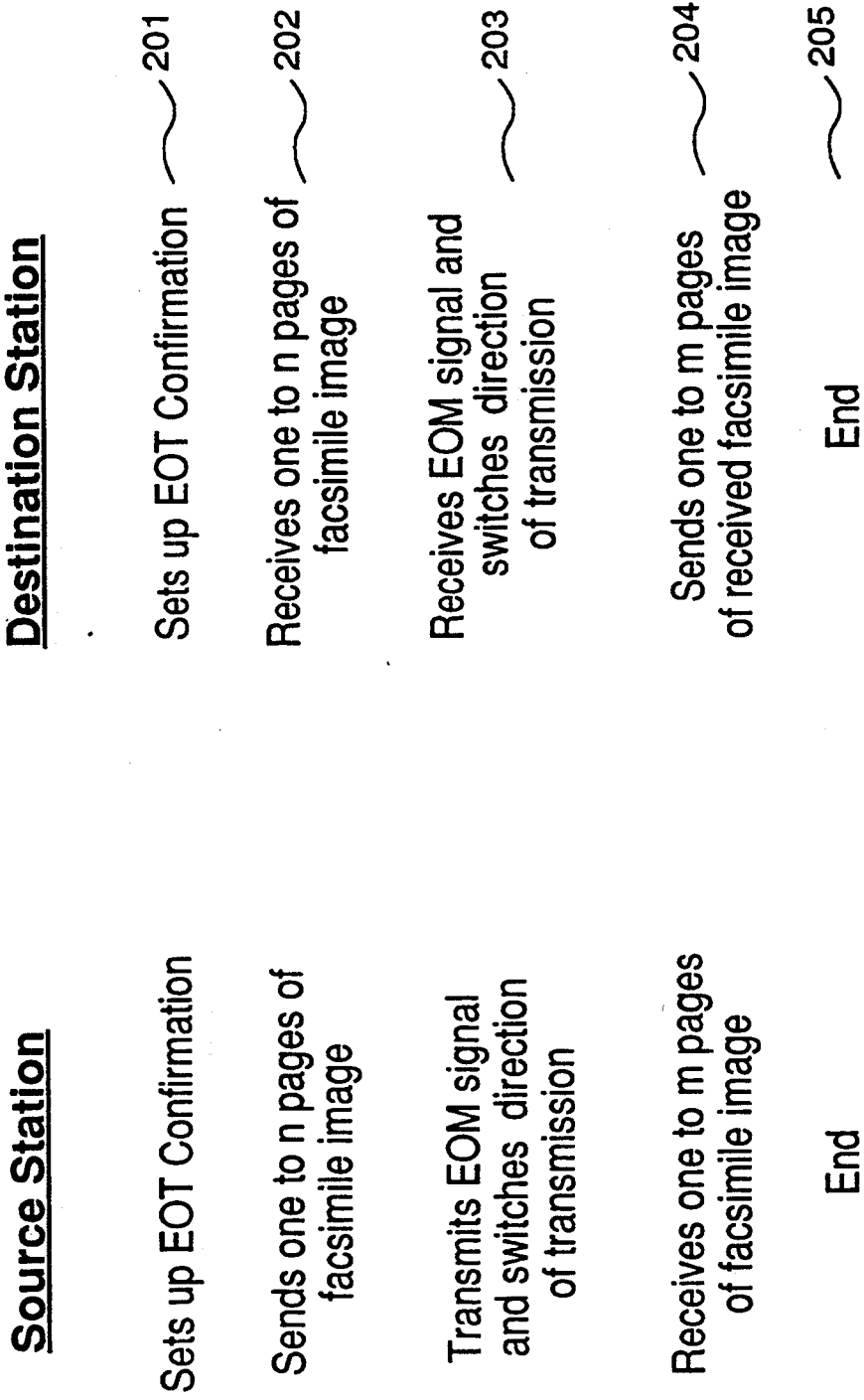
FIG. 2 shows the logic flow between two facsimile machines performing an End-of-Transmission Confirmation.

FIG. 2 shows the logic of the End of Transmission (EOT) confirmation mode. During step 201, the source and destination stations set up the EOT confirmation mode. Note that a given facsimile machine will be a source station when sending a message and a destination station when receiving a message. The source station then transmits the entire document (one to n, where n is the total number of pages) to the destination station during step 202. When transmission is complete (i.e. when the source station sends an End of Message (EOM) signal to the destination station), the source station switches the direction of transmission to accept confirmation pages in step 203. Then, the destination station transmits as many confirmation pages (one to m, where m is the total number of confirmation pages) as the EOT confirmation mode dictates (step 204). The confirmation facsimile transmission terminates in step 205.

Figure 3:
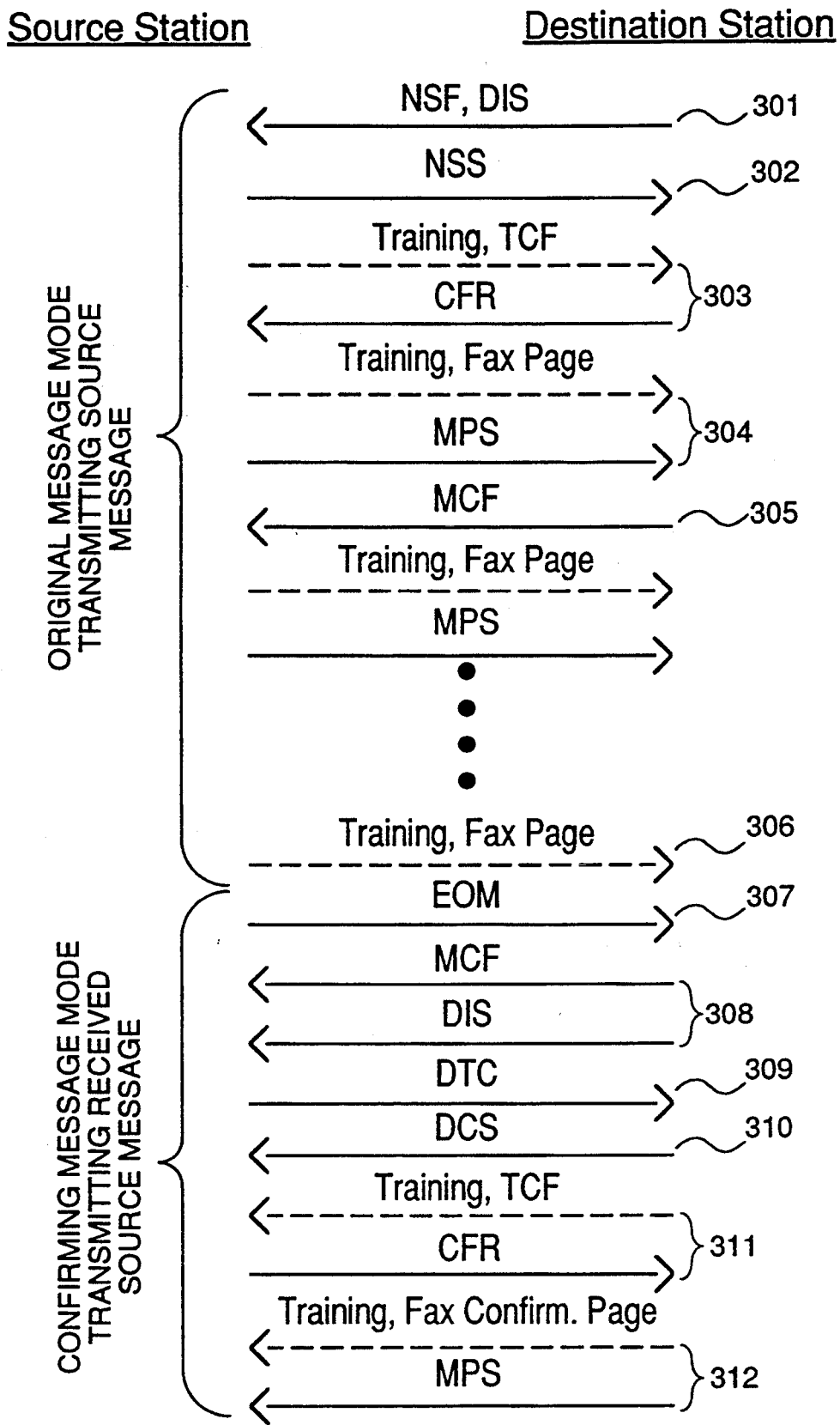
FIG. 3 (FIG. 3(1) and FIG. 3(2)) shows the procedure signal flow between two facsimile machines performing an End-of-Transmission Confirmation.
Figure 3:
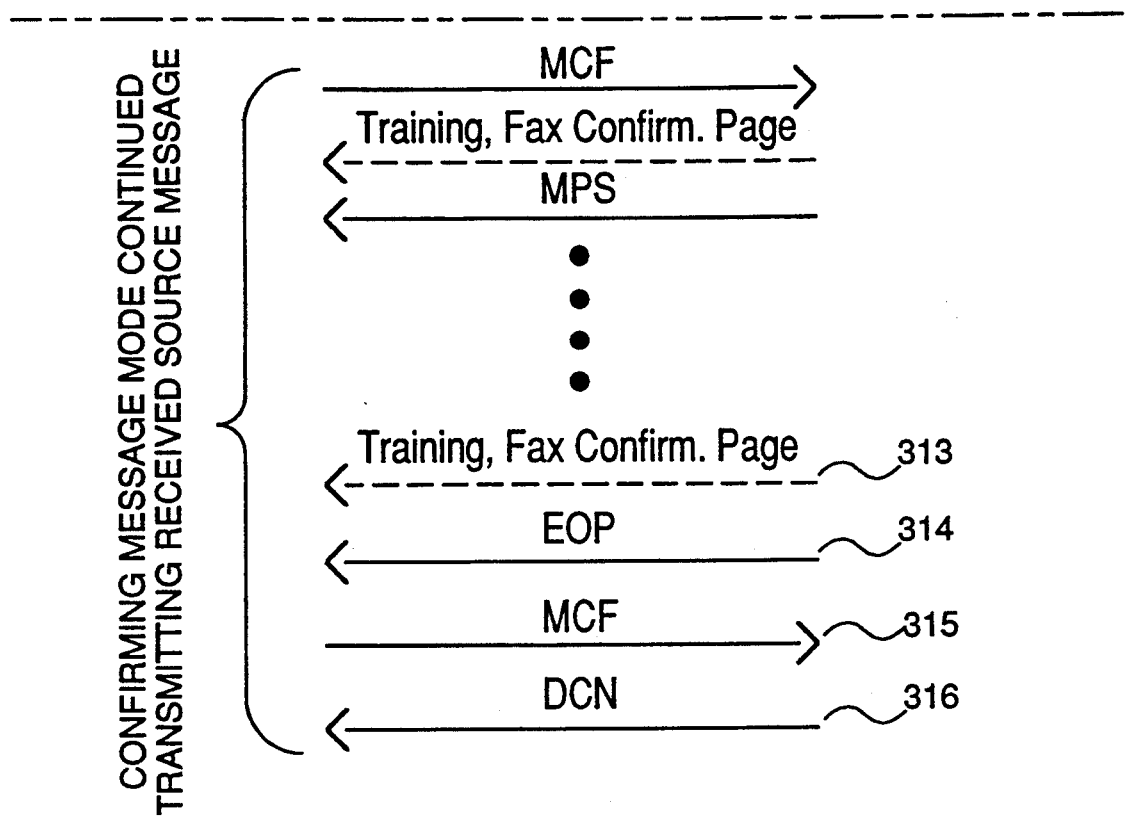

FIG. 3 shows the detailed procedure signal exchange for End of Transmission (EOT) confirmation. When the facsimile call is answered, the procedure signal flow is established. The destination station starts in step 301 by sending an optional Non-Standard Facilities (NSF) signal and then a standard Digital Identification signal (DIS) representing the types of non-standard and standard capabilities of which it is capable, respectively. The NSF signal indicates, in particular, whether the station can confirm and, if so, the type of facsimile confirmation it is able to do.

Combining the Non-Standard Facilities (NSF) signal with the earlier instructions given by the sender at control panel 109, the source station responds in step 302 with the Non-Standard Facilities Set-up signal (NSS) which represents commands to the destination station regarding what non-standard and standard facilities to use for the forthcoming facsimile transmission. Because the source station has been instructed by the sender to get an End of Transmission (EOT) confirmation, that information is passed on to the destination station in the Non-Standard Facilities Set-up signal NSS. At this point, both the source and destination stations have been set up for EOT confirmation.

In step 303, the source station turns on its modulation system for facsimile image data transmission and sends over the Training Check (TCF) signal, to which the destination station responds with the Confirmation to Receive (CFR) signal.

The source station then sends one page of image data and, at the end of the page, the Multipage signal (MPS) in step 304. As the facsimile image data is transmitted, the destination station stores the relevant parts of each page in the image memory 105, formatting the page as necessary in accordance with requirements of the selected End of Transmission (EOT) confirmation mode (communicated from the source station in the Non-Standard Facilities Set-up signal NSS). The destination station then responds in step 305 with the Message Confirmation (MCF) signal that indicates the destination station has received the last page properly and is ready for the next page of image data. The source station then repeats the process of sending in the next image page and Multipage signal (MPS) (as seen in step 304), and then waiting for the Message Confirmation (MCF) signal (as seen in step 305) until the last page is transmitted in step 306.

In step 307, the source station sends the End of Message (EOM) signal which tells the destination station that the source station has sent the last image page and that the source station wants to switch the direction of transmission so as to be able to receive from the destination station the facsimile confirmation pages. Upon receiving the EOM signal, and because of the non-standard facilities set-up at the beginning of the call, the destination station responds in step 308 with a Message Confirmation (MCF) signal and then follows it with a Digital Identification signal (DIS). Responding to the DIS signal in step 309, the source station sends the Digital Transmit Command (DTC) signal indicating that the source station wants to receive rather than to transmit, and representing the set of standard facilities it is capable of as a receiver. The destination station then sends the Digital Command Signal (DCS) to complete the line turnaround in step 310.

In step 311, the destination station then turns on the modulation system for facsimile image data transmission and sends over the Training Check (TCF) signal, to which the source station responds with the Confirmation to Receive (CFR) signal.

In step 312, the destination station accesses its image memory 105, sends the source station the first confirmation page in facsimile image format followed by the Multipage signal (MPS), and waits for the Message Confirmation (MCF) signal from the source station. The destination station repeats this process for each confirmation page until the last confirmation page is transmitted in step 313. At the end of the last confirmation page, the destination station sends an End of Procedures (EOP) signal during step 314 indicating the end of all confirmation pages. Upon receiving the Message Confirmation (MCF) signal from the source station in step 315, the destination station sends out the Disconnect (DCN) signal in step 316 causing the source station to hang up. The destination station also hangs itself up at this time.

FIG. 4 shows the logic used in Page by Page (PBP) confirmation. First, the source and destination stations set up the PBP confirmation mode in step 401. Then, the source station transmits the first image page of the document in step 402. Because of the PBP confirmation requirement, the source station initiates a switch of transmission direction at the end of the first page in step 403, whereupon the destination station transmits back the entire page (or a portion thereof, depending on the PBP confirmation requirement) to the source station in step 404.

A subsequent switch of transmission direction takes place during step 405 after the destination station has transmitted the confirmation page of the first document page. Then, in step 406, the second page is sent from the source station to the destination station. The line is then turned around, and the destination station transmits back to the source station the second page the destination station just received. This process is repeated for each subsequent document page the source station sends, until all pages have been sent and confirmed in step 407. The facsimile transmission terminates at step 408.

Figure 5:
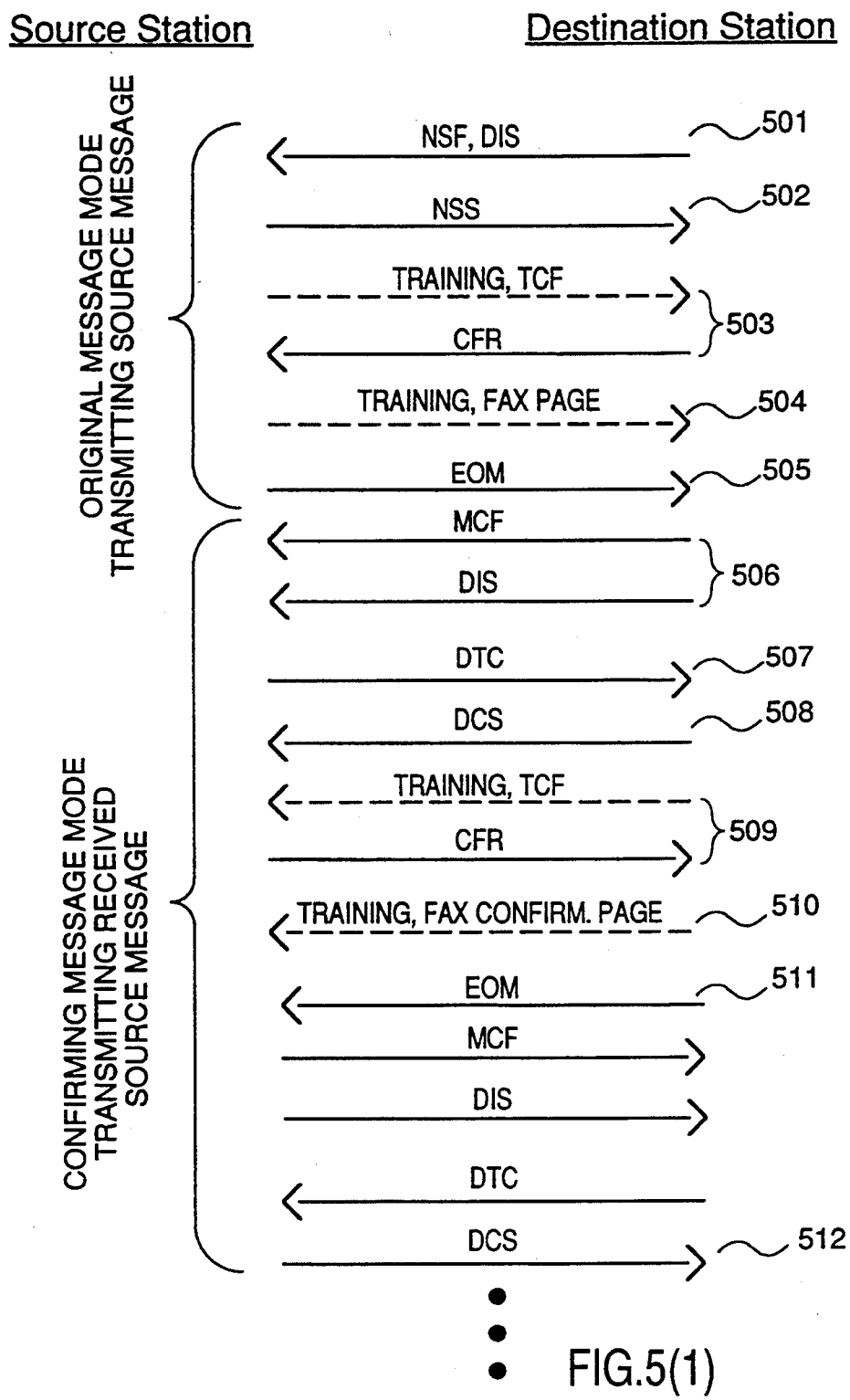
FIG. 5 (FIG. 5(1) and FIG. (2)) shows the procedure signal flow between two facsimile machines performing a Page-by-Page Confirmation.
Figure 5:
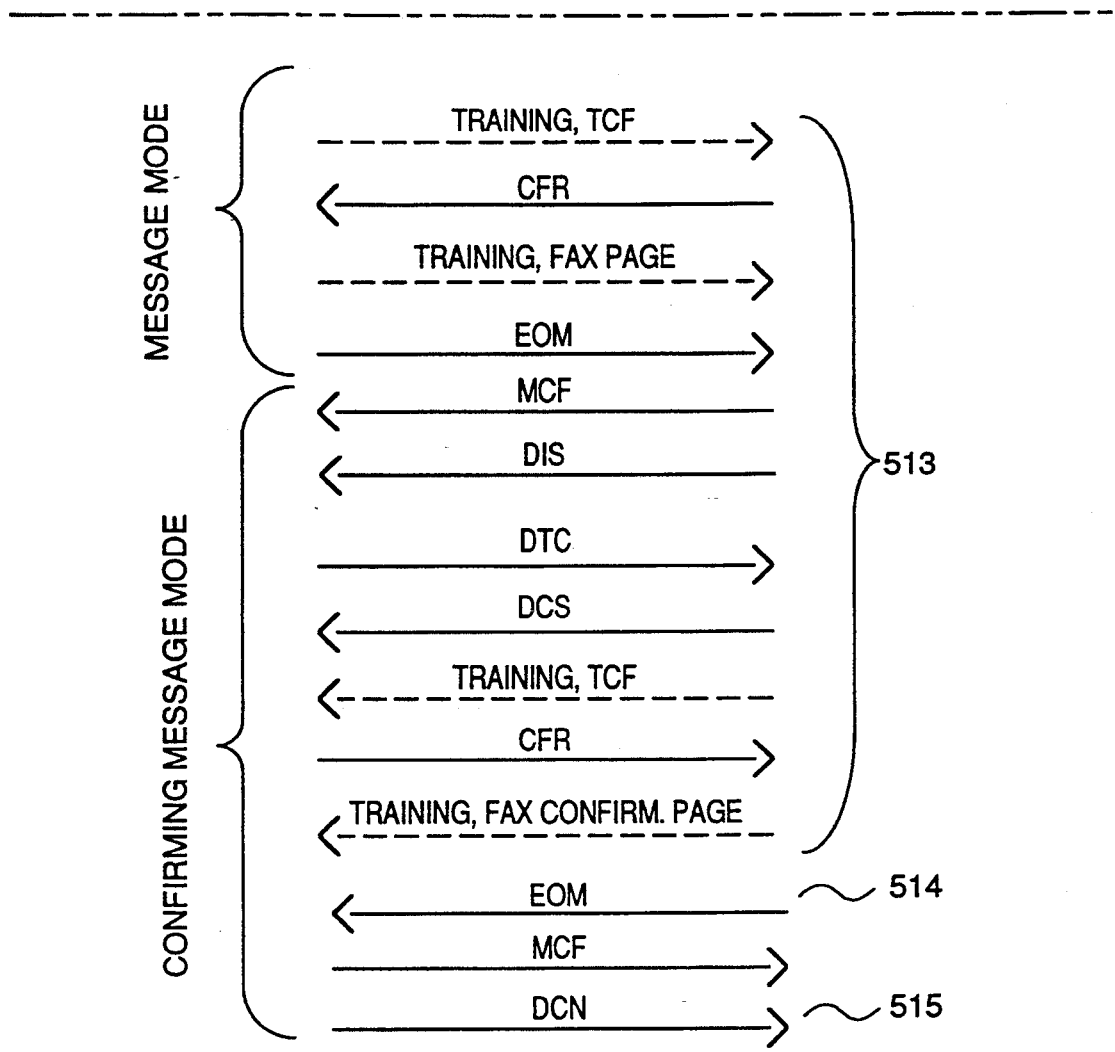

FIG. 5 shows the detailed procedure signal flow for Page by Page Confirmation (PBP). Upon answering the facsimile call, the destination station starts in step 501 by sending the Non-Standard Facilities (NSF) signal and Digital Identification (DIS) signal which declare the station's capabilities for both non-standard and standard functions. The source station then responds in step 502 with the Non-Standard Facilities Set-up signal (NSS) which commands the destination station, for example, to perform the Page by Page (PBP) confirmation for this transmission. In this manner, the PBP confirmation mode is set up between the source and destination stations.

In step 503, the source station turns on the modulation system for facsimile image data transmission and sends the Training Check (TCF) signal, to which the destination station responds with the Confirmation to Receive (CFR) signal indicating it is ready to receive image data. In step 504, one page of image data is then sent from the source to the destination where the image data is stored in image memory 105 (see FIG. 1) and reformatted as necessary in accordance with requirements of the Page by Page (PBP) confirmation mode agreed upon between the source and destination stations. For example, the PBP confirmation mode determines whether the retransmission from the destination station back to the source station is a whole page, the top half of a page, or a bottom half of a page.

At the end of the image page transmission, the source station sends the End of Message (EOM) signal in step 505 to initiate the turnaround of transmission direction. The destination station responds in step 506 by sending the Message Confirmation (MCF) signal, followed by the Digital Identification signal (DIS). The source station sends the Digital Transmit Command (DTC) signal in step 507 indicating that the source station wants to receive rather than transmit, and representing the set of standard facilities the source station is capable of as a receiver. In step 508, the destination station then makes its choices, such as the data signalling rate or the minimum scan line time, and communicates these choices in the subsequent Digital Command signal (DCS). Thereupon, the source station is ready to receive, and the destination station ready to transmit.

In step 509, before the first confirmation page is transmitted, the destination station sends the Training Check (TCF) signal and receives the Confirmation to Receive (CFR) signal. Then the destination station retrieves the confirmation page data from the image memory 105 and sends that data to the source station in step 510.

In step 511, the end of the confirmation image page transmission, the destination station sends the End of Message (EOM) signal to initiate yet another switch of transmission direction so that the source station can send in the next page. Following transmission of the MCF and DIS signals from the source and the DTC signal from the destination (the MCF, DIS and DTC signals were defined above in conjunction with steps 506 and 507), the line switch is completed when the source station sends the Digital Command signal (DCS) to the destination station in step 512. The process of line turnaround, training check, and image page transmission is then repeated as many times as required, except that the roles of the source and destination stations are reversed each time, each station alternately playing transmitter and then receiver of an image page or a confirmation page as shown by the steps 513.

Upon completion of the transmission of the confirmation page for the last document page, the destination station sends back the End of Message (EOM) signal in step 514 because the destination station has no knowledge that the pages in the document to be transmitted have been exhausted. The source station, however, knowing that all pages have been sent and confirmed, sends the Message Confirmation (MCF) signal followed by the Disconnect (DCN) signal to terminate the transmission in step 515.

Figure 6:
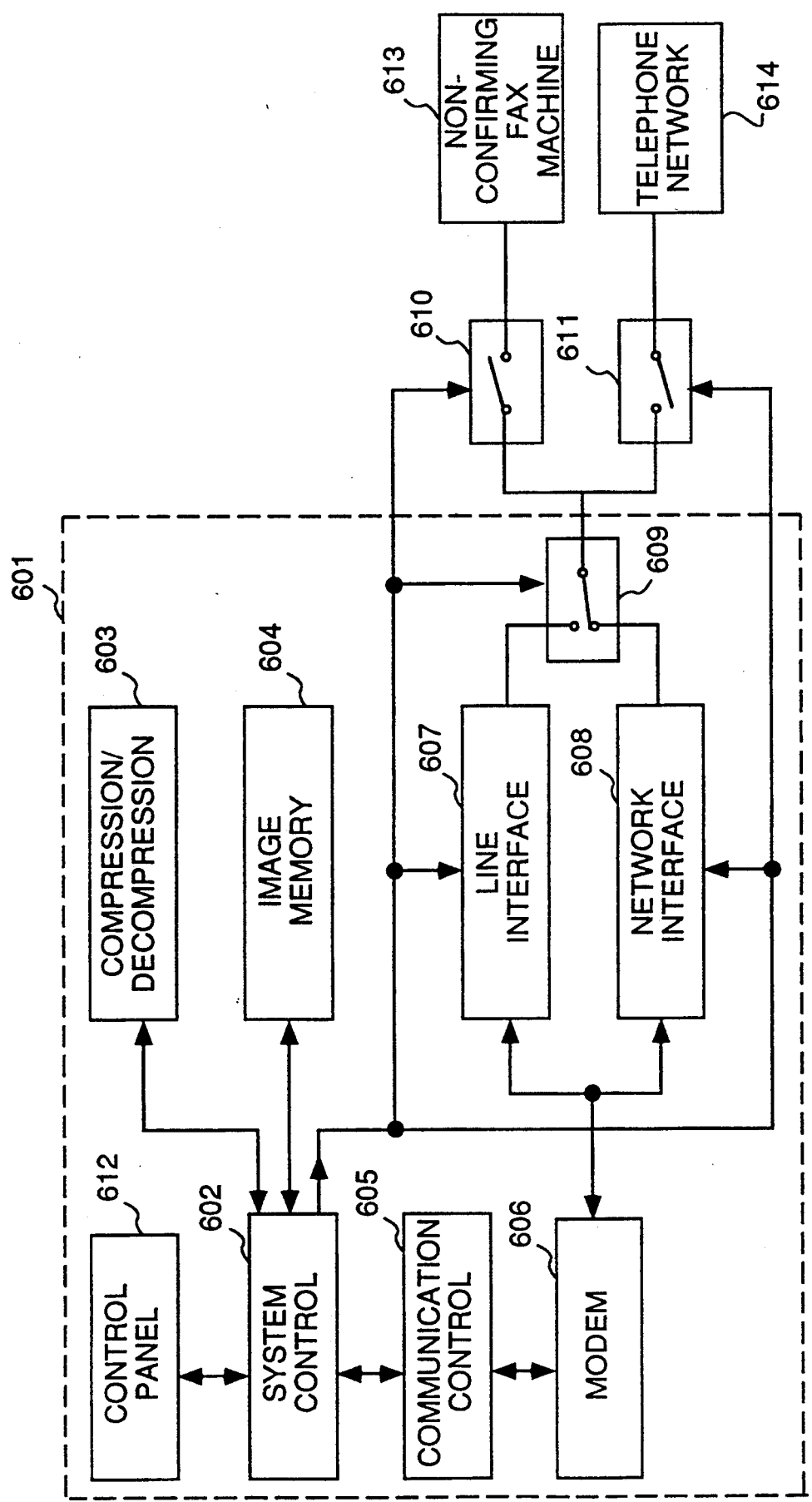
FIG. 6 is a block diagram illustrating an add-on device capable of converting a non-confirming facsimile device into a confirming facsimile device.

FIG. 6 illustrates another embodiment of the present invention. In FIG. 6, the functions of facsimile confirmation are provided by an add-on device 601 coupled to a standard facsimile machine which does not possess the capability of facsimile confirmation (hereinafter referred to as the non-confirming facsimile machine 613). Add-on device 601 is attached between the non-confirming machine 613 and a phone line from a telephone network 614. Electrically, add-on device 601 is connected in parallel to the non-confirming facsimile machine 613. Hence, no change is required in the non-confirming machine 613 which is still used in the standard way for both document transmission and receipt.

Once connected between non-confirming facsimile machine 613 and telephone network 614, add-on device 601 continuously monitors the facsimile transmission and receipt activities of non-confirming machine 613. Hence, all procedure and image signals that take place in a facsimile transmission are observed by add-on device 601. If the non-confirming facsimile machine 613 is the source station of a facsimile transmission, then at the end of the transmission, add-on device 601 receives an end of transmission facsimile confirmation from the destination side. On the other hand, if the non-confirming machine 613 is the destination station of a facsimile transmission, then at the end of the transmission, add-on device 601 sends an end of transmission confirmation to the source station with image data it has saved during the transmission.

In this manner, the standard operations of the non-confirming machine 613 are not affected, yet the functions of End of Transmission (EOT) confirmation have been provided without the need to replace the original unit. Moreover, even if both the source and destination stations are non-confirming facsimile machines, EOT facsimile confirmation is achieved by attaching an add-on device 601 to each machine.

Referring to FIG. 6, device 601 includes a system control unit 602 which is in charge of overall operation and all processes that take place in the device. System control 602 typically includes a microprocessor. Data compression/decompression unit 603 compresses image data for transmission, and decompresses image data that add-on device 601 receives. The image data is temporarily stored in and retrieved from an image memory 604. A control panel 612 comprising keys and a display allows the operator to input instruction for the add-on device 601, such as instructions for the composition of the confirmation facsimile page. Control panel 612 also displays operational status information to the operator.

In accordance with the present invention, add-on device 601 also includes a communication control unit 605 which carries out a facsimile communication either as a sender or a receiver. Modem 606, connected to communication control unit 605, modulates and demodulates image and procedure signals. Add-on device 601 interfaces between telephone network 614 and standard facsimile machine 613 by a line interface unit 607 and a network interface unit 608. Specifically, the line interface unit 607 provides telephone central office functions including battery and ringing voltage for line control, while network interface unit 608 provides connection between add-on device 601 and telephone network 614.

Line interface unit 607, network interface unit 608, non-confirming facsimile machine 613, and telephone network 614 are interconnected by three switches 609, 610, and 611. Switches 610 and 611 are open or closed, whereas switch 609 is connected to either line interface unit 607 or network interface unit 608. All switching is controlled by system control unit 602.

For example, if switches 610 and 611 are closed while switch 609 is connected to network interface unit 608, then non-confirming facsimile machine 613 is directly connected to telephone network 614 with add-on device 601 monitoring this connection. In another configuration, switch 610 is open, switch 611 is closed, and switch 609 is connected to network interface unit 608, thereby disconnecting non-confirming facsimile machine 613 from telephone network 614 while connecting add-on device 601 to the network. In yet another configuration, switch 611 is open, switch 610 is closed, and switch 609 is connected to line interface unit 607, thereby disconnecting both add-on device 601 and non-confirming facsimile machine 613 from telephone network 614 while allowing add-on device 601 to ring non-confirming facsimile machine 613 and transmit facsimile data to it through line interface unit 607.

In accordance with the present invention, add-on device 601 performs End of Transmission (EOT) confirmation after a Disconnect (DCN) signal has been sent by the source station to the destination station to terminate a facsimile transmission. By standard definition, the DCN signal requires no response from the destination station. In fact, a non-confirming facsimile machine typically hangs up the phone line after a DCN signal has been sent from the source station (or after the DCN signal has been received by the destination station). In accordance with the present invention, add-on device 601 takes over the phone connection only after the Disconnect (DCN) signal. Thus, the standard operations of non-confirming facsimile machine 613 are not affected.

Figure 7:
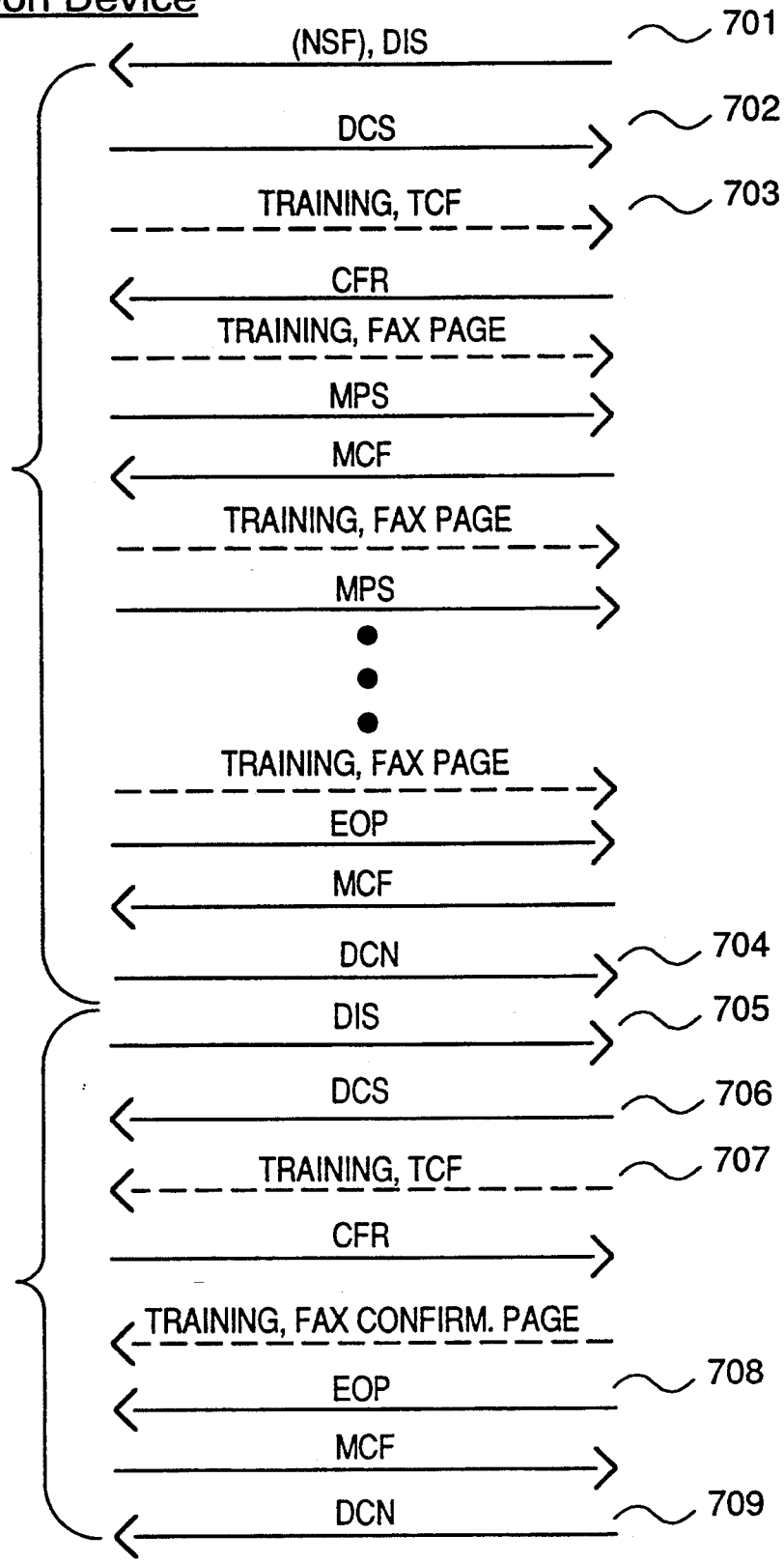
FIG. 7 shows the procedure signal flow between a non-confirming standard facsimile machine with an attached add-on device on the source side and a confirming facsimile machine on the destination side.

FIG. 7 shows the flow of procedure signals to perform an End of Transmission (EOT) confirmation when an add-on device 601 is attached to a non-confirming facsimile machine on the source side and the destination station is either a confirming facsimile machine or a non-confirming facsimile machine 613 with an add-on device 601 attached to it (thereby functioning as a confirming facsimile machine). In the "idle" state for add-on device 601 (see FIG. 6), non-confirming facsimile machine 613 is connected to telephone network 614 by closing switches 610, and 611, while add-on device 601 is also connected to telephone network 614 by connecting switch 609 to network interface unit 608. In this manner, as mentioned previously, add-on device 601 monitors activities between facsimile machine 613 and phone network 614.

As the source station, non-confirming facsimile machine 613, places a facsimile call to a destination station via telephone network 614, device 601 detects the phone call initiation through detection circuits (not shown) in network interface unit 608. At this time, add-on device 601 only monitors the procedure signal flow and image data between the source and the destination stations using modem 606 and communication control unit 605. Therefore, to the non-confirming facsimile machine 613 (the source station), add-on device 601 is transparent as facsimile transmission takes place.

Referring now to FIG. 7, the destination station initially responds with a Digital Identification signal (DIS) in step 701. The DIS signal will be preceded by a Non-Standard Facilities (NSF) signal for facsimile confirmation because the destination station is a confirming facsimile machine. Because the source station is a non-confirming facsimile machine, it will ignore the NSF signal and respond with only a Digital Command (DCS) signal in step 702. Then, standard procedure signals and image data are exchanged in step 703 while a facsimile document is transmitted from the source to the destination station.

Figure 9A:
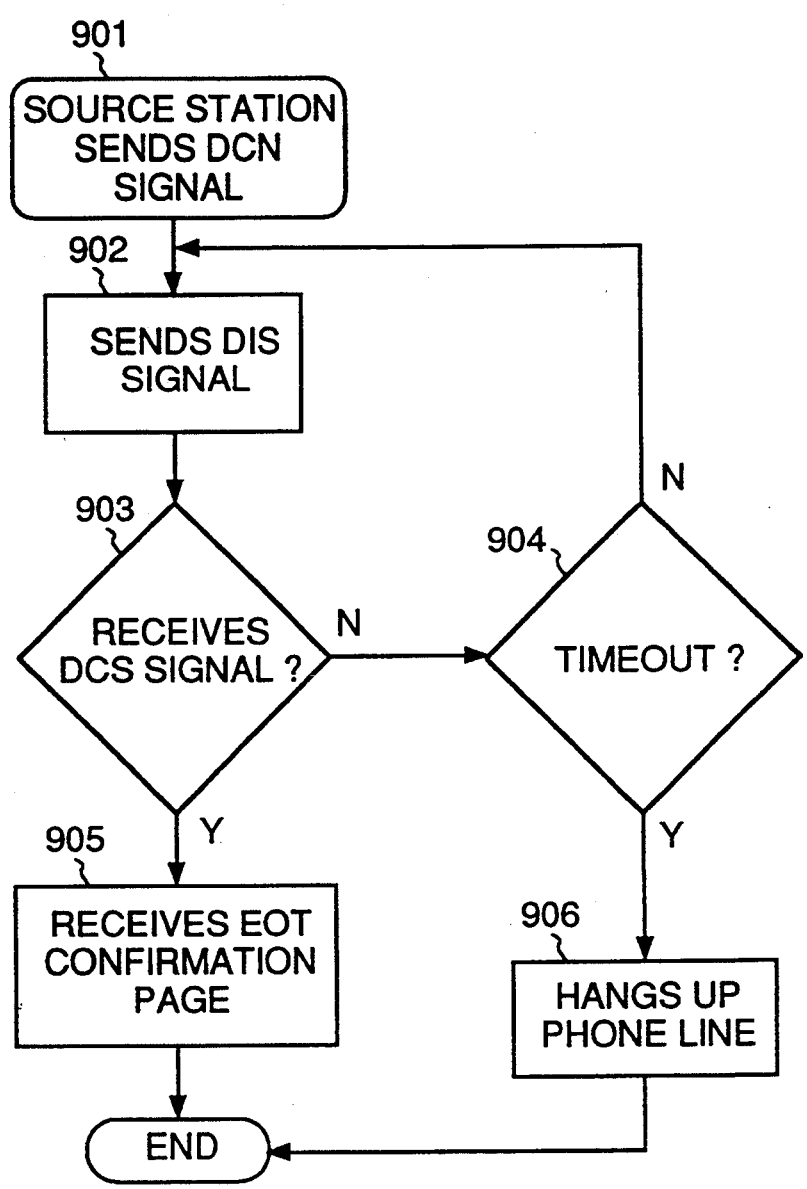
FIG. 9A is a flowchart illustrating the operation of End of Transmission (EOT) confirmation in a source station which is a confirming facsimile machine.
Figure 9B:
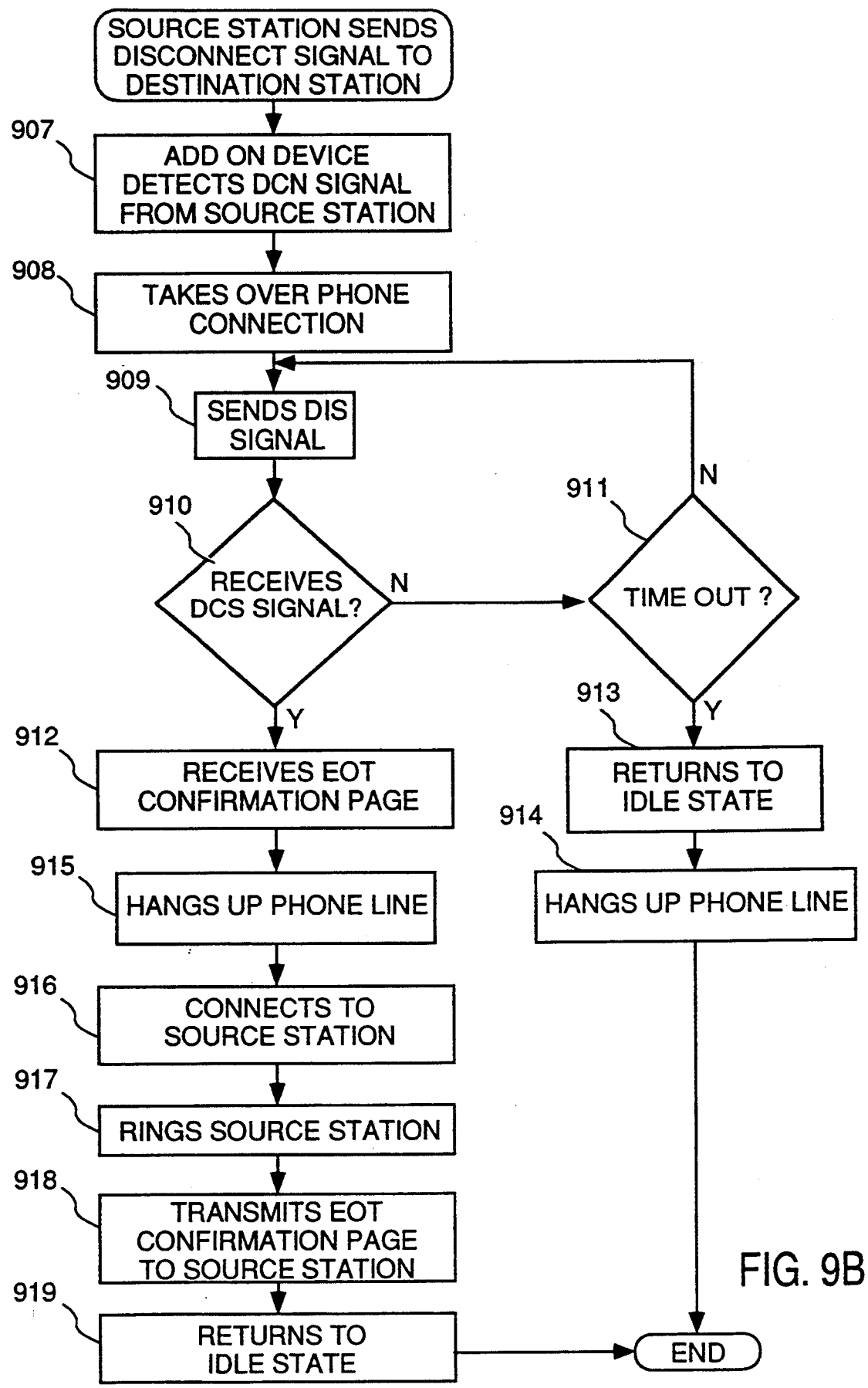
FIG. 9B is a flowchart showing the operation of End of Transmission (EOT) confirmation in a source station which is a non-confirming standard facsimile machine having an add-on device.

When the source station sends out the disconnect (DCN) signal in step 704 to terminate the facsimile transmission, add-on device 601 detects this signal and starts taking actions as shown in FIG. 9B. Specifically, when add-on device 601 detects the DCN signal sent out from the source station in step 907, device 601 opens switch 610 (see FIG. 6), thereby disconnecting non-confirming facsimile machine 613 from the telephone network 614 in step 908 (FIG. 9B). Because switch 611 is closed and switch 609 is connected to network interface 608, add-on device 601 takes over the connection to telephone network 614 from non-confirming facsimile machine 613 and prepares to receive an End of Transmission (EOT) confirmation. In step 909, add-on device 601 sends out a Digital Identification (DIS) signal (see step 705 in FIG. 7) via telephone network 614 to the destination station and waits for a Digital Command signal (DCS) (see step 706 in FIG. 7) from the destination station in step 910.

If a DCS signal is received, add-on device 601 waits to receive the end of transmission (EOT) confirmation page in step 912. Transmission of this page begins with a Training Check (TCF) signal as shown in step 707 of FIG. 7. After receiving the confirmation page and storing it in image memory 604, add-on device 601 receives the End of Procedures (EOP) signal (in step 708) from the destination station, sends a Message Confirmation (MCF) signal and then receives a disconnect (DCN) signal (in step 709) which terminates the call.

At this time, add-on device 601 disconnects from telephone network 614 in step 915 by opening switch 611, changes switch 609 to connect to line interface unit 607, and closes switch 610 in step 916 to connect to non-confirming facsimile machine 613. In step 917, add-on device 601 applies a ringing voltage through line interface 607 to non-confirming facsimile machine 613. In step 918, add-on device 601 supplies a battery source for non-confirming facsimile machine 613 to answer and to communicate through line interface unit 607. Add-on device 601 then retrieves the image for the confirmation page from image memory 604, and transmits this image to non-confirming facsimile machine 613 in a regular facsimile transmission using the communication control unit 605 and the modem 606. After the confirmation pages are transmitted, add-on device 601 restores switches 609, 610, and 611 for line monitoring in step 919 and returns to its idle state.

If the Digital Command signal (DCS) is not received in step 910, then add-on device 601 resends the Digital Identification signal (DIS) (step 909) and once again waits for the DCS signal which appears in step 910. This process is repeated until a predetermined time out is reached as seen in step 911. When a time out is reached, add-on device 601 then closes switch 610 in step 913. After hanging up the phone line in step 914, add-on device 601 returns to its idle state to monitor line activities of non-confirming facsimile machine 613.

Figure 11:
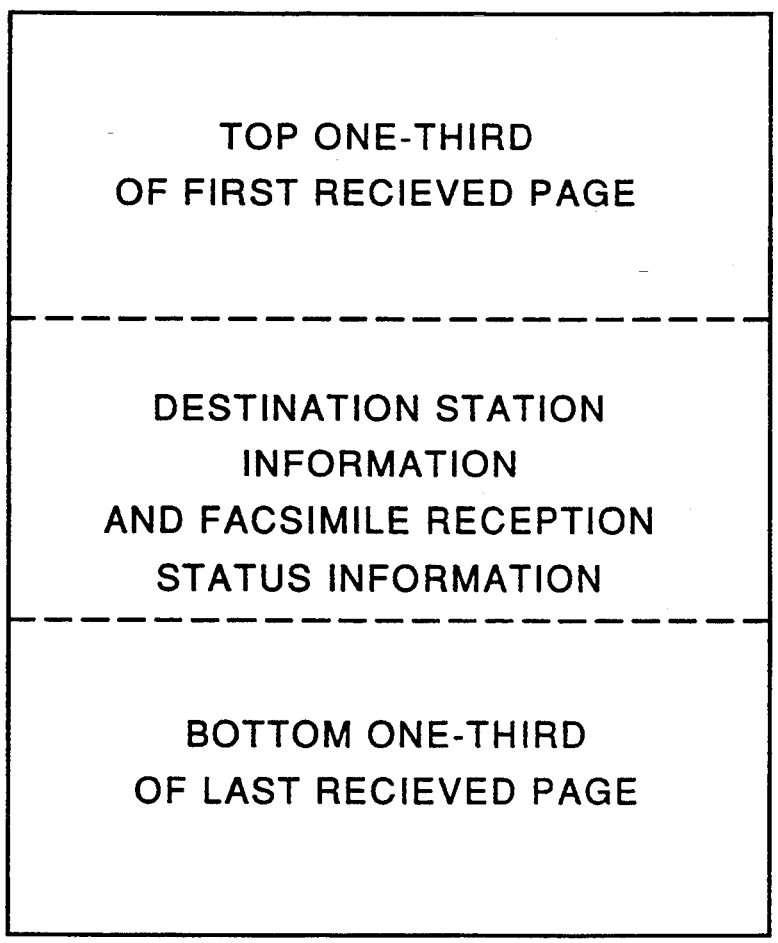
FIG. 11 shows one example of a single-page facsimile confirmation including message data from the first and last pages of the original facsimile transmission and information about the destination station and the original transmission.

Note that FIGS. 7 and 9B refer to a confirming destination station sending a single confirmation page to add-on device 601. An illustrative single confirmation page is shown in FIG. 11 wherein the top one-third of the first page and the bottom one-third of the last page of the original facsimile message are reproduced together with data about the destination station and the status of the facsimile transmission. Data on the destination station may include the phone number, and name and address of company at the destination side. Status about the original facsimile transmission may include date and time of the facsimile reception, the number of pages, and the number of errors. A single confirmation page is reasonable because the confirming destination station has no information regarding the memory capacity of the add-on device 601 (this information will be explained in detail below). If additional confirmation pages are desired, the DIS and DCS procedure signal exchange in step 705 and 706 are substituted with the NSF, DIS, and NSS signal exchange as in steps 301 and 302 of FIG. 3. This substitution provides the confirming destination station with information, for example the memory capacity, of add-on device 601, thereby allowing for additional confirmation pages (up to the memory capacity of add-on device 601) to be sent by the confirming destination station.

Figure 10A:
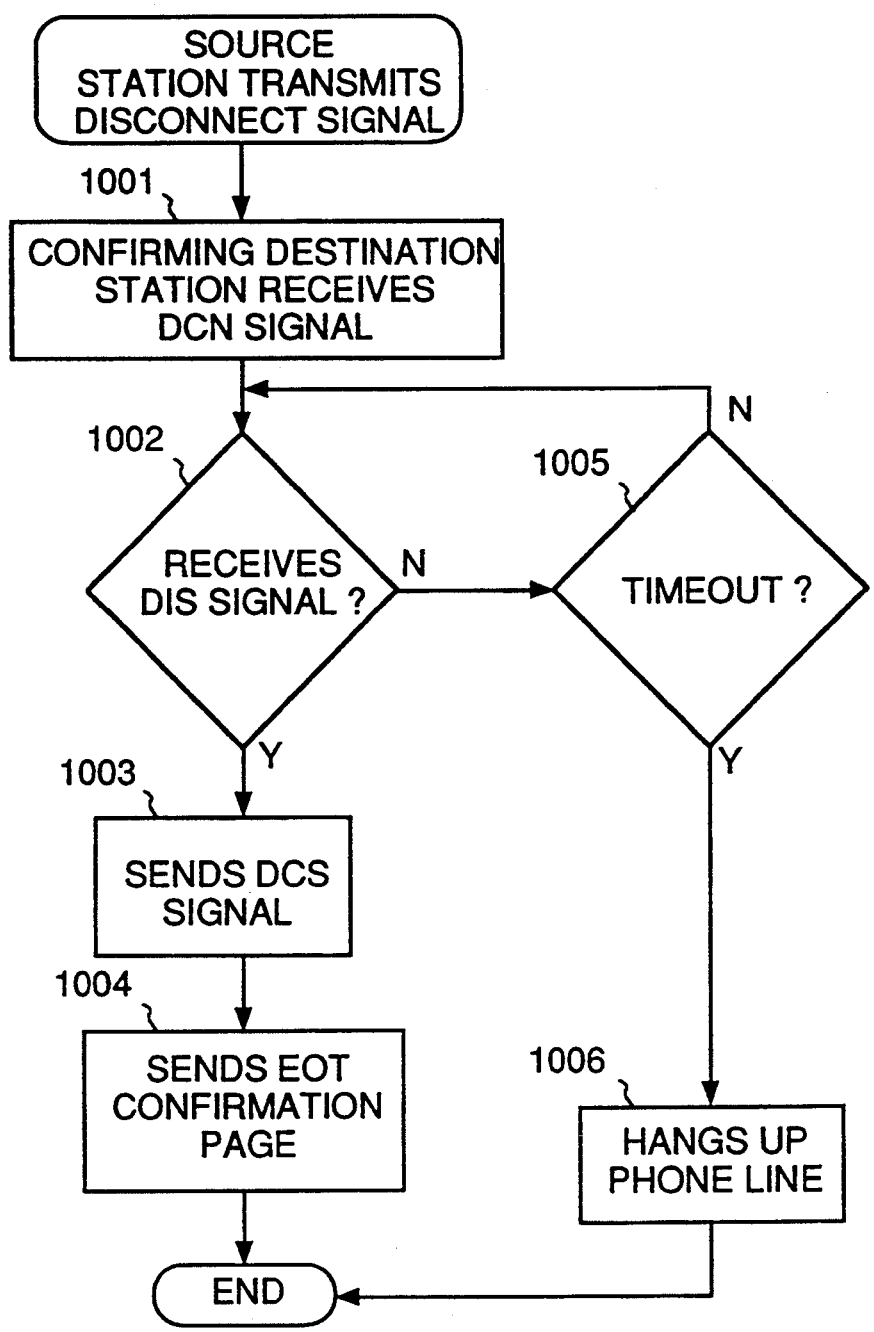
FIG. 10A is a flowchart illustrating the operation of End of Transmission (EOT) confirmation in a destination station which is a confirming facsimile machine.

The decision process for a confirming facsimile machine on the destination side is depicted in FIG. 10A. This decision process is more fully understood in conjunction with FIG. 7. In FIG. 7, the confirming destination station sends the NSF and DIS procedure signals in step 701. However, the confirming destination station only receives the DCS signal back as in step 702. As a result of the preceding signal exchange between the destination and source stations, two configurations of the source station are possible. In the first configuration, the source station is a non-confirming facsimile machine. In the second configuration, the source station is a non-confirming facsimile machine with an add-on device, thereby providing the source station with EOT confirmation capability. The destination station cannot determine whether the source station has a first or second configuration until step 704 wherein the source station sends a DIS signal after a DCN signal.

Referring again to FIG. 10A, the destination station, upon receiving the Disconnect (DCN) signal in step 1001, waits for the Digital Identification (DIS) signal in step 1002 until a predetermined time has passed (step 1005). If the DIS signal is not received within this time period, the destination station hangs up the phone line in step 1006. If the DIS signal arrives in time, the destination station sends out a Digital Command (DCS) signal in response (step 706 in FIG. 7, step 1003 in FIG. 10A) and transmits the confirmation page stored in the image memory 105 in step 1004.

The decision process for an add-on device 601 used on the destination side, in contrast to the source side as described above, is shown in FIG. 10B, and will be explained in detail in conjunction with a discussion of FIG. 8.

Figure 8:
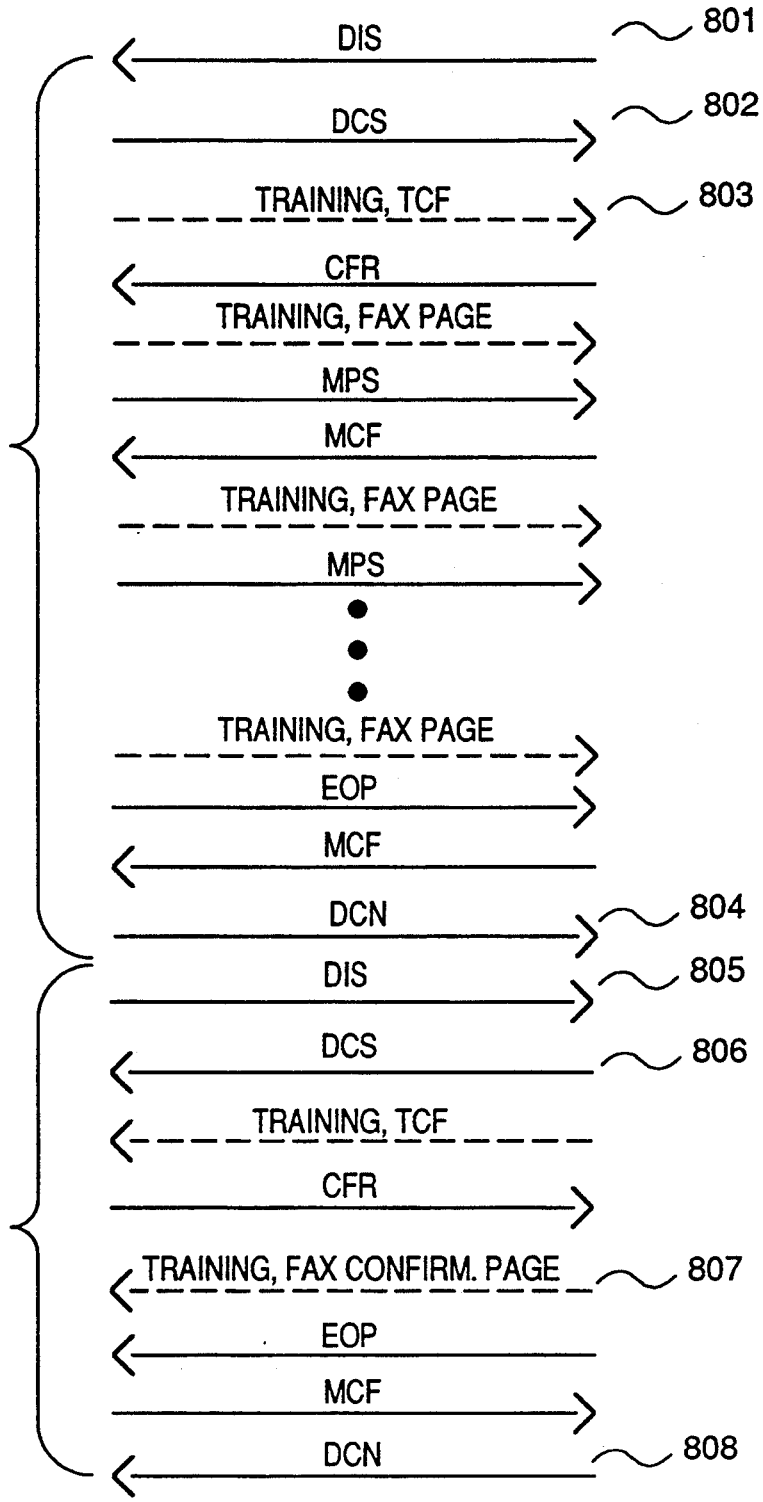
FIG. 8 shows the procedure signal flow between a non-confirming standard facsimile machine with an attached add-on device on the destination side and a confirming facsimile machine on the source side.

The procedure signal flow contained in FIG. 8 shows how add-on device 601 (FIG. 6) connected to a non-confirming facsimile machine performs End of Transmission (EOT) confirmation on the destination side while the source side is either a confirming facsimile machine or a non-confirming facsimile machine 613 having an add-on device 601.

When the source station calls, add-on device 601 on the destination side is in its idle state, i.e. switches 610 and 611 are closed and switch 609 is connected to network interface unit 608 (see FIG. 6). Ringing current from telephone network 614 is detected by network interface unit 608 as well as by non-confirming facsimile machine 613. At this point, non-confirming facsimile machine 613 (as the destination station) answers the call and receives the facsimile transmission coming from the source station. Although add-on device 601 detects this incoming call to non-confirming facsimile machine 613, it will not attempt to interfere with this facsimile transmission. Instead, add-on device 601 stays on-line monitoring all the procedure signal flow and image data that pass through network interface 608.

Referring to FIG. 8, because the destination station is a non-confirming facsimile machine, it will not send a Non-Standard Facilities (NSF) signal specifying its confirming mode capabilities. Rather, the non-confirming destination station sends a Digital Identification (DIS) signal in step 801. The source station responds with a Digital Command signal (DCS) in step 802, and the Training Check (TCF) signal in step 803. Then, the standard process of facsimile transmission takes place. Throughout this process, add-on device 601 attached to the destination station observes all the procedure signals and image data passing through the telephone connection by using network interface unit 608, communication control unit 605, and modem 606. Moreover, add-on device 601 selects parts of the image data transmitted from the source station and stores the data in image memory 604. The parts saved in image memory 604 may include, for example, parts of the first page and parts of the last page which will be used to compose the end of transmission EOT confirming page (described above and shown in FIG. 11). When the source station sends the disconnect (DCN) signal in step 804, add-on device 601 follows the flowchart shown in FIG. 10B.

Figure 10B:
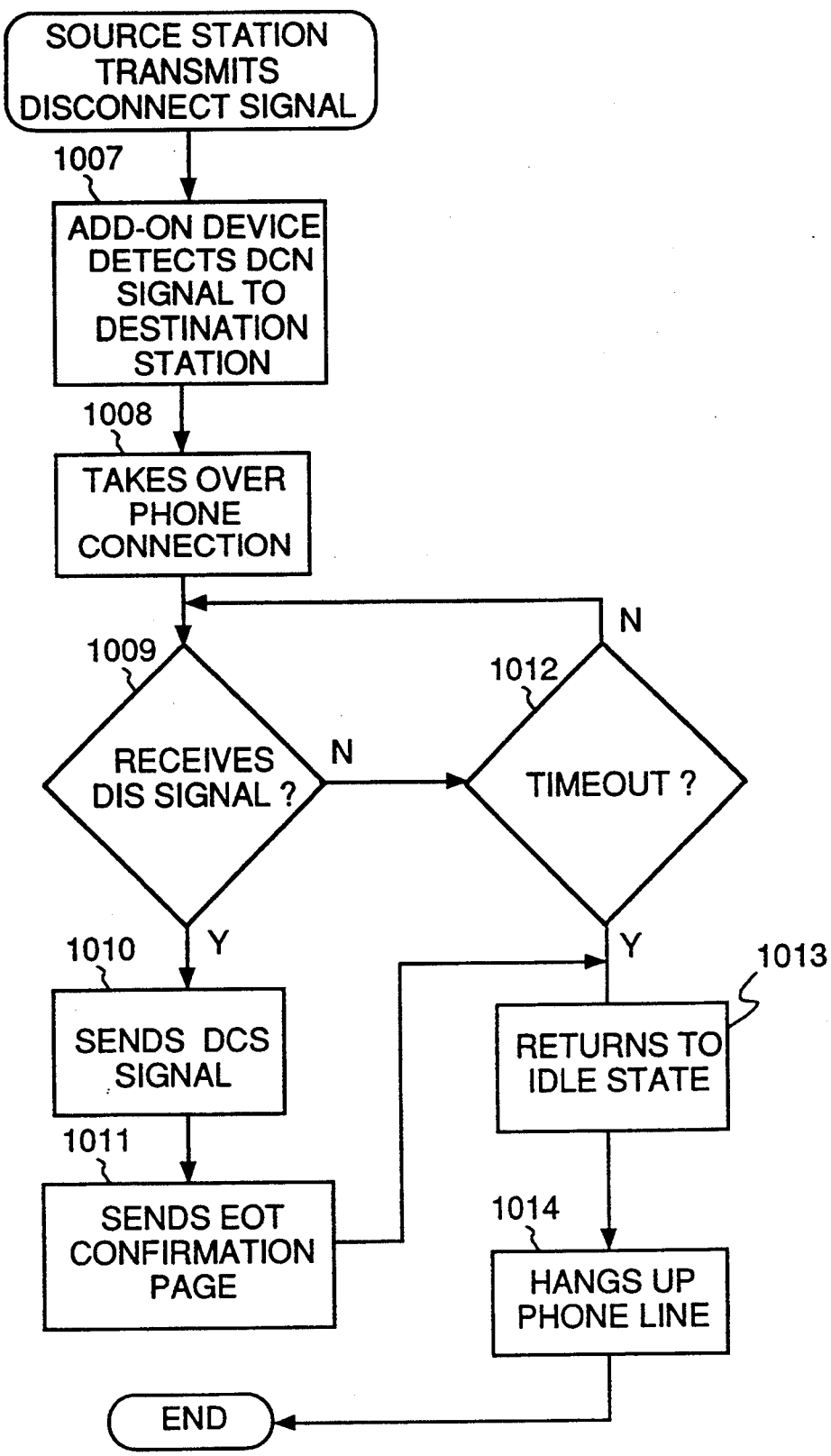
FIG. 10B is a flowchart showing the operation of End of Transmission (EOT) confirmation in a destination station which comprises an add-on device attached to a non-confirming standard facsimile machine.

Referring to FIGS. 6, 8 and 10B, upon detecting the DCN signal (step 804 in FIG. 8/step 1007 in FIG. 10B) from the source station, add-on device 601 takes over the phone connection in step 1008 by opening switch 610, thereby disconnecting the destination facsimile machine 613 from the phone network 614. Note that switch 611 is still closed from the monitor mode of add-on device 601. Thus, the telephone network 614 is connected to add-on device 601 through network interface unit 608. At this time, add-on device 601 waits for the Digital Identification signal (DIS) from the source station (steps 805/1009). When the DIS signal is received, add-on device 601 responds with the Digital Command (DCS) signal (steps 806/1010). Add-on device 601 then formats the End of Transmission (EOT) confirming page in its image memory 604, and then transmits the EOT confirming page to the source station (steps 807/1011). Upon completing the transmission of the EOT confirmation page, add-on device 601 sends an End of Procedures (EOP) signal, which prompts the source station to transmit a Message Confirmation (MCF) signal. Finally, add-on device 601 sends a disconnect (DCN) signal, returns to an idle state (steps 808/1013) and then hangs up the phone line in step 1014.

If the DIS signal in step 1009 is not received., device 601 waits until a predetermined time period has elapsed (step 1012), at which time add-on device 601 returns to its idle state (step 1013), and hangs up the phone line (step 1014) by closing switch 610, thereby reconnecting the non-confirming facsimile machine 613 back to the telephone network 614.

FIG. 9A illustrates the above operation of End of Transmission (EOT) confirmation on the source side after step 804 (see FIG. 8). The confirming source station follows the flowchart in FIG. 9A because the confirming source station cannot determine if the destination station is capable of facsimile confirmation in steps 801 and 802 of FIG. 8. Thus, the confirming source station sends the DIS signal after sending the DCN signal as in step 804 and 805. If the destination station responds with a DCS signal, the destination station is capable of confirmation. Otherwise, the destination station is a non-confirming facsimile machine. Referring to both FIGS. 8 and 9A, after the confirming source station has sent out the disconnect (DCN) signal (steps 804/901), it then sends the Digital Identification signal (DIS) (steps 805/902). The confirming source station then waits for a Digital Command signal (DCS) (steps 806/903). The source station resends the DIS signal until a predetermined time (time-out) has expired, (step 904), at which time it will hang up the phone line in step 906 (step 808). If, however, a digital command signal DCS is received within the predetermined time period, then the confirming source station prepares to receive the confirmation page in step 905 (see also step 807). After receipt of the confirmation page, the source station waits to receive an End of Procedures (EOP) signal and then transmits a Message Confirmation (MCF) signal. Finally, the source station receives a disconnect (DCN) signal (step 808).

This system provides several advantages:

1. A facsimile machine in accordance with the present invention eliminates the prior art problems of confirming receipt of a facsimile transmission by adding a confirming mode to both the sending and receiving machines.
2. Implementation of this confirming operation is described by a straightforward application of unmodified CCITT T.30 procedure signals so that modifications to existing facsimile machines for incorporating the confirming mode can be kept to a minimum, i.e. most software routines can remain unchanged.
3. An add-on device can perform facsimile confirmation at the end of document transmission by being attached to an existing standard facsimile machine that is incapable of the confirming mode. This add-on device can be used in the existing installed base of standard non-confirming facsimile machines.
4. The facsimile machine and facsimile confirmation method according to the present invention may be used in a network conforming to CCITT standards for Group 3 and Group 4 facsimile transmission. Note the confirmation method is equally valid in other facsimile environments with its own proprietary procedure signals and message data coding/decoding schemes assuming the proprietary procedure signals have similar structural properties to the CCITT T.30 standards.
5. Because the facsimile confirmation takes place on-line within the original transmission, the cost in additional phone charges caused by the confirmation is born by the source side which requested the confirmation service.

The preceding description is meant to be illustrative only and not limiting. Those skilled in the art will be able to fabricate other devices in accordance with this invention based on the above description without departing from the spirit and scope of the invention.

Appendix A

CFR: Confirmation to Receive
  Signal sent by the receiver (destination station) confirming that the receiver (destination station) is ready to receive the facsimile message from the transmitter (source station).

DCS: Digital Command Signal
  Signal from the transmitter (source station) representing a command to the receiver (destination station) regarding what standard facilities to use for the forthcoming facsimile transmission.

DIS: Digital Identification Signal
  Signal identifying the types of standard capabilities which a facsimile device is capable of performing as a receiver (destination station).

DTC: Digital Transmit Command
  Signal indicating that the transmitter (source station) wants to receive rather than to transmit, and representing the set of standard facilities the transmitter (source station) is capable of as a receiver (destination station).

DCN: Disconnect
  Signal causing the transmitter (source station) and the receiver (destination station) to hang up.

EOM: End of Message
  Signal indicating to the receiver (destination station) that the transmitter (source station) has sent the last image page and is ready to return to pre-message procedure such as switching the direction of transmission to receive facsimile confirmation pages.

EOP: End of Procedures
  Signal indicating the end of transmission of all pages or all confirmation pages.

EOT: End of Transmission
  Confirmation mode occurring after the end of transmission of all facsimile pages from the source to the destination station which includes transmission back to the source station of one or more facsimile pages received by the destination station.

MCF: Message Confirmation
  Signal indicating that the receiver (destination station) has received the last page of facsimile transmission and is prepared for the next page of image data.

MPS: Multi-Page Signal
  Signal indicating to the receiver (destination station) that the transmitter (source station) has sent a page of facsimile data and is ready to send another page upon receipt of confirmation.

NSF: Non-Standard Facilities
  Signal indicating what types of non-standard capabilities the facsimile machine is capable of performing as a receiver (destination station).

NSS: Non-Standard Facilities Set-Up Signal
  Signal sent by the transmitter (source station) representing a command to the receiver (destination station) regarding what non-standard facilities to use for the forthcoming facsimile transmission.

PBP: Page by Page
  Confirmation mode occurring after transmission of each facsimile image page, i.e. page by page.

TCF: Training Check
Signal sent by the transmitter (source station) for verifying acceptability of the communication channel before facsimile pages are sent.

I claim:

1. A method for confirming an original transmitted facsimile message comprising the steps of:
   (a) providing automatic on-line facsimile confirmation of at least a portion of an original transmitted facsimile message; and
   (b) creating a one page confirmation including a first plurality of message data signals from a first page of said facsimile transmission, and a second plurality of message data signals from a second page of said facsimile transmission.

2. A method of confirming a facsimile transmission comprising the steps of:
   (a) setting up a predetermined type of transmission confirmation between a source station and a destination station;
   (b) sending a plurality of message data signals which comprise at least a portion of said facsimile transmission from said source station to said destination station;
   (c) switching the direction of said facsimile transmission; and
   (d) sending at least a portion of said plurality of message data signals of said facsimile transmission from said destination station to said source station to allow the sender at the source station to determine the receipt at the destination station of the transmitted information and its quality.

3. The method of claim 2 wherein steps (a), (b), (c) and (d) are implemented by CCITT standard facsimile procedure signals for Group 3 facsimile transmission.

4. The method of claim 3 wherein step (a) includes:
   sending a non-standard facilities signal from said destination station to said source station; and
   sending a non-standard facilities set up signal from said source station to said destination station.

5. The method of claim 4 wherein step (b) includes storing said plurality of message data signals in a memory in said destination station.

6. The method of claim 5 wherein step (c) includes:
   sending a message confirmation signal and a digital identification signal from said destination station to said source station;
   sending a digital transmit command from said source station to said destination station; and
   sending a digital command signal from said destination station to said source station.

7. The method of claim 6 wherein step (d) includes:
   sending a training check signal from said destination station to said source station;
   sending a confirmation to receive signal from said source station to said destination station; and
   sending said plurality of message data signals stored in said memory from said destination station to said source station.

8. The method of claim 2 further including, after step (d),
   step (e) switching the direction of facsimile transmission between said source station and said destination station.

9. The method of claim 8 wherein said step (e) is implemented by CCITT standard facsimile procedure signals for Group 3 facsimile transmission.

10. The method of claim 9 wherein step (e) further includes:
    sending a message confirmation signal and a digital identification signal from said source station to said destination station;
    sending a digital transmit command from said destination station to said source station;
    sending a digital command signal from said source station to said destination station;
    sending a training check signal from said source station to said destination station; and
    sending a confirmation to receive signal from said destination station to said source station.

11. The method of claim 10 further comprising:
    step (f) repeating steps (b)–(e) until all of said plurality of message data signals have been received.

12. A method for confirming an original transmitted facsimile message comprising the steps of:
    (a) providing automatic on-line facsimile confirmation of at least a portion of an original transmitted facsimile message;
    (b) coupling an add-on device between a non-confirming facsimile device and a telephone network, wherein said non-confirming facsimile device is a source station;
    (c) monitoring a facsimile transmission comprising a plurality of message data signals between said source station with said add-on device and a destination station until a disconnect signal is detected;
    (d) disconnecting said non-confirming facsimile device from a telephone network;
    (e) connecting said add-on device to said telephone network;
    (f) switching the direction of facsimile transmission for the purpose of facsimile confirmation;
    (g) sending at least a portion of said plurality of message data signals of said facsimile transmission as facsimile confirmation from said destination station to said add-on device;
    (h) storing said facsimile confirmation in a memory of said add-on device;
    (i) disconnecting said add-on device from said telephone network;
    (j) connecting said add-on device to said non-confirming facsimile device;
    (k) transferring said facsimile confirmation from said add-on device to said non-confirming facsimile device; and
    (l) reconnecting said non-confirming facsimile device to said telephone network; and
    (m) returning said add-on device to an idle state.

13. The method of claim 12 wherein step (f) conforms to CCITT standard facsimile procedure signals for Group 3 facsimile transmission.

14. The method of claim 13 wherein step (f) includes sending a digital identification signal from said add-on device to said destination station, and sending a digital command signal from said destination station to said add-on device.

15. The method of claim 14 wherein if the time between steps (f) and (g) exceeds a predetermined amount, then said add-on device proceeds directly to step (m).

16. A method for confirming an original transmitted facsimile message comprising the steps of:
    (a) providing automatic on-line facsimile confirmation of at least a portion of an original transmitted facsimile message;

(b) coupling an add-on device between a non-confirming facsimile device and a telephone network, wherein said non-confirming facsimile device is a destination station;

(c) monitoring a facsimile transmission comprising a plurality of message data signals between said destination station with said add-on device and a source station;

(d) storing at least a portion of said plurality of message data signals of said facsimile transmission in a memory of said add-on device until a disconnect signal is detected;

(e) disconnecting said non-confirming facsimile device from said telephone network;

(f) connecting said add-on device to said telephone network;

(g) switching the direction of facsimile transmission for the purpose of facsimile confirmation;

(h) sending said stored portion of said plurality of message data signals from said add-on device as facsimile confirmation to said source station;

(i) disconnecting said add-on device from said telephone network;

(j) reconnecting said non-confirming facsimile device to said telephone network; and (k) returning said add-on device to an idle state.

17. The method of claim 16 wherein step (g) is implemented by CCITT standard facsimile procedure signals for Group 3 facsimile transmission.

18. The method of claim 17 wherein step (g) includes sending a digital identification signal from said source station to said add-on device, and sending a digital command signal from said add-on device to said source station.

19. The method of claim 18 wherein if the time between the detection of said disconnect signal in step (d) and the detection of said digital identification signal in step (g) exceeds a predetermined amount, then said add-on device proceeds directly to step (k).

20. An apparatus for making a non-confirming facsimile device a confirming facsimile device comprising:

means for controlling operations of said apparatus;

means for storing image data connected to said means for controlling;

means for compressing said image data for transmission or decompressing said image data for receipt, connected to said means for controlling;

means for carrying out a facsimile communication according to a selected procedure connected to said means for controlling;

means for modulating signals for transmission to a telephone network and demodulating signals received from said telephone network, said means for modulating/demodulating connected to said means for carrying out a facsimile communication;

means for providing operational instructions to said apparatus connected to said means for controlling;

a line interface unit connected to said means for modulating/demodulating and said means for controlling;

a network interface unit connected to said means for modulating/demodulating and said means for controlling; and switching means for selectively connecting said non-confirming facsimile device to said telephone network.

21. The apparatus of claim 20 wherein said means for modulating/demodulating comprises a modem.

22. The apparatus of claim 21 wherein said switching means comprises:

a first switch connected to either said line interface unit or said network interface unit; and a second and a third switch connected to said first switch;

wherein said second switch is switchably connected to said non-confirming facsimile device and said third switch is switchably connected to said telephone network.

23. The apparatus of claim 22 wherein a signal from said means for controlling controls the switching of said first, second, and third switches.

* * * * *